United States Patent
Chendamarai Kannan et al.

(10) Patent No.: US 11,374,696 B2
(45) Date of Patent: Jun. 28, 2022

(54) HYBRID AUTOMATIC REPEAT REQUEST (HARQ) PROCESS PARTITIONING

(71) Applicant: QUALCOMM Incorporated, San Diego, CA (US)

(72) Inventors: Arumugam Chendamarai Kannan, San Diego, CA (US); Mostafa Khoshnevisan, San Diego, CA (US); Xiaoxia Zhang, San Diego, CA (US); Jing Sun, San Diego, CA (US); Tao Luo, San Diego, CA (US); Makesh Pravin John Wilson, San Diego, CA (US); Vinay Chande, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/736,677

(22) Filed: Jan. 7, 2020

(65) Prior Publication Data
US 2020/0228246 A1  Jul. 16, 2020

Related U.S. Application Data

(60) Provisional application No. 62/791,603, filed on Jan. 11, 2019.

(51) Int. Cl.
*H04L 1/18* (2006.01)
*H04L 5/00* (2006.01)

(52) U.S. Cl.
CPC .......... *H04L 1/1812* (2013.01); *H04L 1/1835* (2013.01); *H04L 1/1861* (2013.01); *H04L 5/0053* (2013.01)

(58) Field of Classification Search
CPC ... H04L 1/1812; H04L 1/1835; H04L 1/1861; H04L 5/0055
See application file for complete search history.

(56) References Cited

U.S. PATENT DOCUMENTS

2018/0234359 A1  8/2018  Hosseini et al.
2019/0068334 A1* 2/2019  Stern-Berkowitz ........................ H04L 1/1812
(Continued)

FOREIGN PATENT DOCUMENTS

WO  2018141246 A1  8/2018
WO  2018228487 A1  12/2018

OTHER PUBLICATIONS

Huawei, et al., "DL Multi-TRP/Panel Operation in R15", 3GPP Draft, R1-1802073, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 16, 2018 (Feb. 16, 2018), XP051397457, 3 pages, Retrieved from the Internet: URL: http://www.3gpp.org/ftp/tsg%5Fran/WG1%5FRL1/TSGR1%5F92/Docs/. [retrieved on Feb. 16, 2018] paragraph [02. 3].

(Continued)

*Primary Examiner* — Ayaz R Sheikh
*Assistant Examiner* — Debebe A Asefa
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a mapping between a plurality of sets of hybrid automatic repeat request (HARQ) processes and a corresponding plurality of HARQ process types. The UE may configure one or more HARQ processes of the UE based at least in part on the indication. In some aspects, a base station may transmit, to a UE, an indication of a mapping between a plurality of sets of HARQ processes and a corresponding plurality of HARQ process types. The base station may select a HARQ process, of the plurality of HARQ processes, to be used for a communication with the (Continued)

UE based at least in part on the mapping. Numerous other aspects are provided.

30 Claims, 10 Drawing Sheets

(56) References Cited

U.S. PATENT DOCUMENTS

2019/0173623 A1* 6/2019 Khosravirad ......... H04L 1/0079
2020/0028635 A1* 1/2020 Lee ....................... H04W 80/08
2020/0154467 A1* 5/2020 Gong .................... H04W 24/08

OTHER PUBLICATIONS

International Search Report and Written Opinion—PCT/US2020/012696—ISA/EPO—dated Apr. 21, 2020.

* cited by examiner

HYBRID AUTOMATIC REPEAT REQUEST (HARQ) PROCESS PARTITIONING

CROSS-REFERENCE TO RELATED APPLICATION

This application claims priority to U.S. Provisional Patent Application No. 62/791,603, filed on Jan. 11, 2019, entitled "HYBRID AUTOMATIC REPEAT REQUEST (HARQ) PROCESS PARTITIONING," which is hereby expressly incorporated by reference herein.

FIELD OF THE DISCLOSURE

Aspects of the present disclosure generally relate to wireless communication and to techniques and apparatuses for hybrid automatic repeat request (HARQ) process partitioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving an indication of a mapping between a plurality of sets of hybrid automatic repeat request (HARQ) processes and a corresponding plurality of HARQ process types; and configuring one or more HARQ processes of the UE based at least in part on the indication.

In some aspects, a UE for wireless communication may include memory and one or more processors operatively coupled to the memory. The memory and the one or more processors may be configured to receive an indication of a mapping between a plurality of sets of HARQ processes and a corresponding plurality of HARQ process types; and configure one or more HARQ processes of the UE based at least in part on the indication.

In some aspects, a non-transitory computer-readable medium may store one or more instructions for wireless communication. The one or more instructions, when executed by one or more processors of a UE, may cause the one or more processors to receive an indication of a mapping between a plurality of sets of HARQ processes and a corresponding plurality of HARQ process types; and configure one or more HARQ processes of the UE based at least in part on the indication.

In some aspects, an apparatus for wireless communication may include means for receiving an indication of a mapping between a plurality of sets of HARQ processes and a corresponding plurality of HARQ process types; and means for configuring one or more HARQ processes of the apparatus based at least in part on the indication.

In some aspects, a method of wireless communication, performed by a base station, may include transmitting, to a UE, an indication of a mapping between a plurality of sets of HARQ processes and a corresponding plurality of HARQ process types; and selecting a HARQ process, of the plurality of HARQ processes, to be used for a communication with the UE based at least in part on the mapping.

In some aspects, a base station for wireless communication may include memory and one or more processors operatively coupled to the memory. The memory and the one or more processors may be configured to transmit, to a UE, an indication of a mapping between a plurality of sets of HARQ processes and a corresponding plurality of HARQ process types; and select a HARQ process, of the plurality of HARQ processes, to be used for a communication with the UE based at least in part on the mapping.

In some aspects, a non-transitory computer-readable medium may store one or more instructions for wireless communication. The one or more instructions, when executed by one or more processors of a base station, may cause the one or more processors to transmit, to a UE, an indication of a mapping between a plurality of sets of HARQ processes and a corresponding plurality of HARQ process types; and select a HARQ process, of the plurality of HARQ processes, to be used for a communication with the UE based at least in part on the mapping.

In some aspects, an apparatus for wireless communication may include means for transmitting, to a UE, an indication of a mapping between a plurality of sets of HARQ processes and a corresponding plurality of HARQ process types; and means for selecting a HARQ process, of the plurality of HARQ processes, to be used for a communication with the UE based at least in part on the mapping.

Aspects generally include a method, apparatus, system, computer program product, non-transitory computer-readable medium, user equipment, base station, transmit receive point (TRP), wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
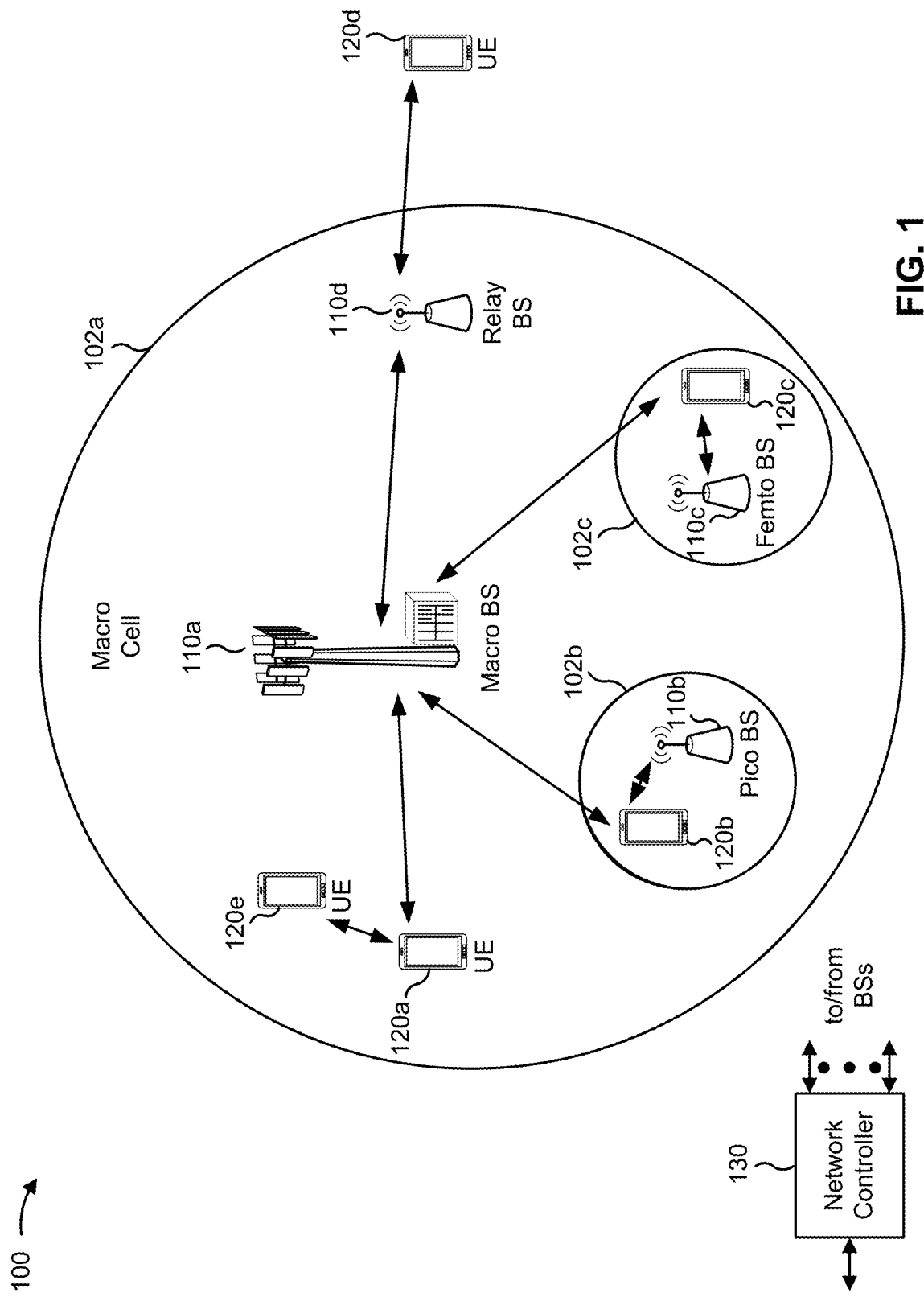
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
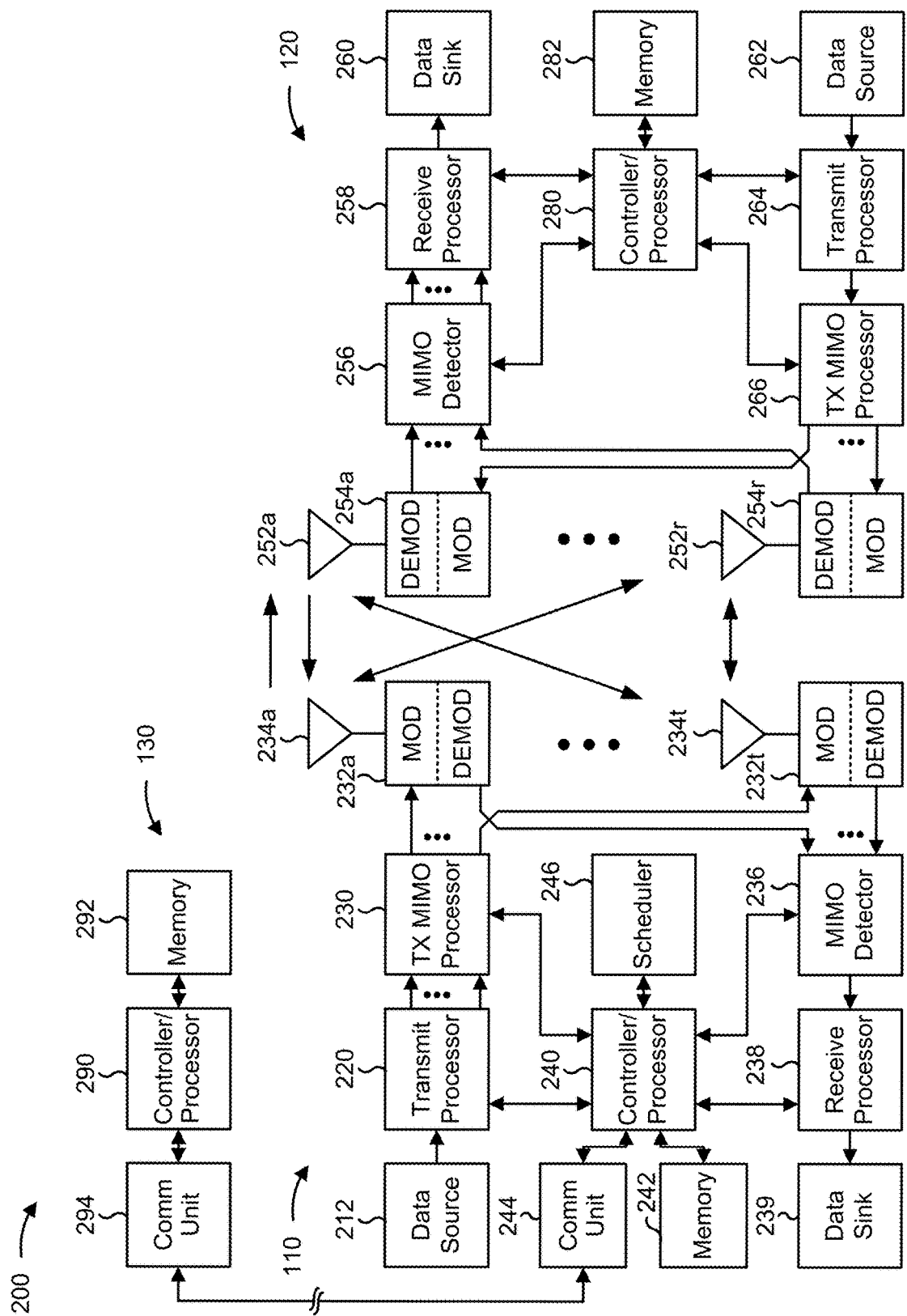
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with HARQ process partitioning, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving an indication of a mapping between a plurality of sets of HARQ processes and a corresponding plurality of HARQ process types; means for configuring one or more HARQ processes of the UE based at least in part on the indication; and/or the like. In some aspects, such means may include one or more components of UE 120 described in connection with FIG. 2.

In some aspects, base station 110 may include means for transmitting, to a UE, an indication of a mapping between a plurality of sets of HARQ processes and a corresponding plurality of HARQ process types; means for selecting a HARQ process, of the plurality of HARQ processes, to be used for a communication with the UE based at least in part on the mapping; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
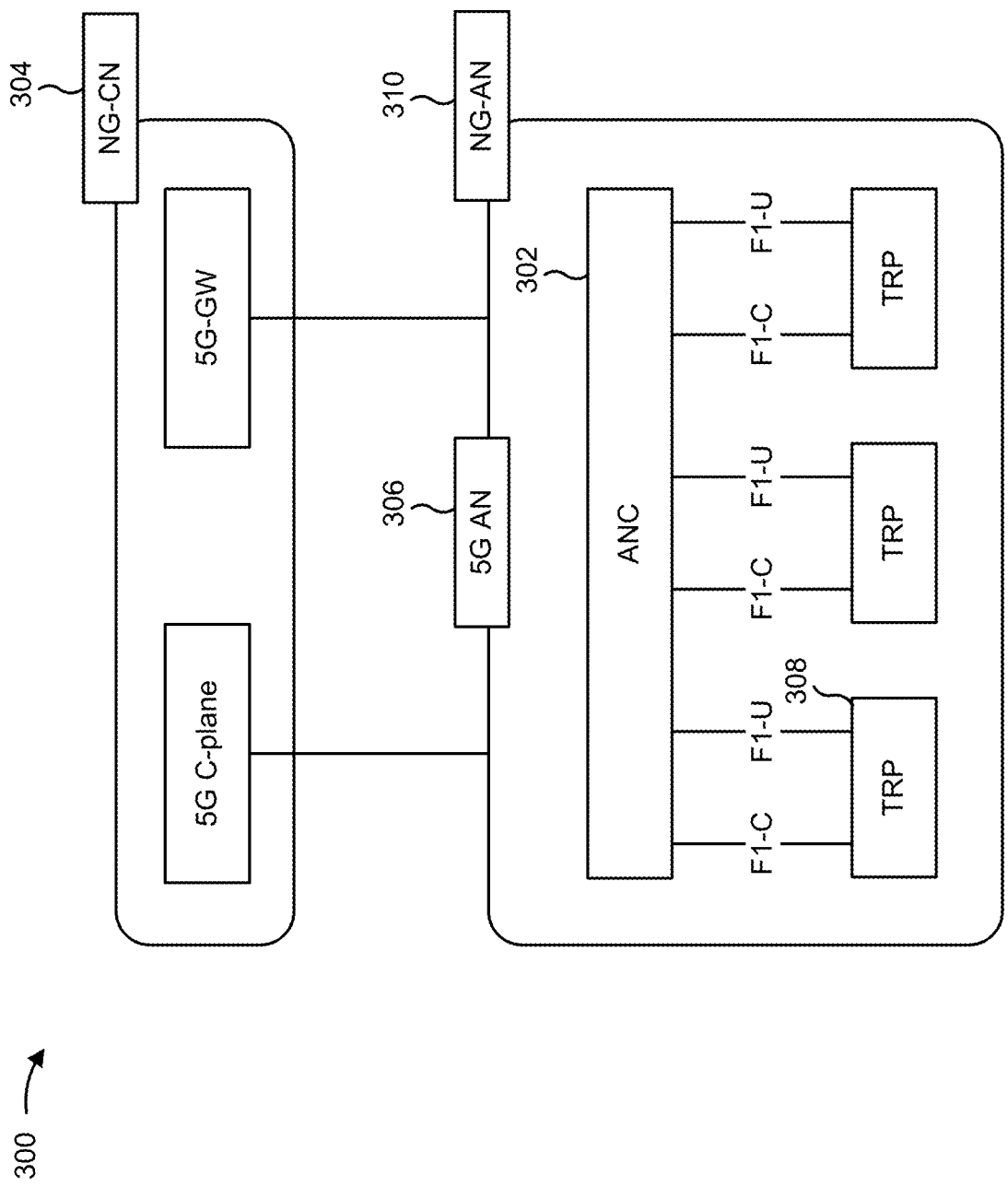
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure.

A 5G access node 306 may include an access node controller (ANC) 302. The ANC 302 may be a central unit (CU) of the distributed RAN 300. The backhaul interface to the next generation core network (NG-CN) 304 may terminate at the ANC 302. The backhaul interface to neighboring next generation access nodes (NG-ANs) may terminate at the ANC 302. The ANC 302 may include one or more TRPs 308 (which may also be referred to as BSs, NR BSs, Node Bs, 5G NBs, APs, gNB, or some other term). A TRP 308 may be used interchangeably with "cell" and/or "panel." In some aspects, multiple TRPs 308 may be included in a single base station 110. Additionally, or alternatively, different TRPs 308 may be included in different base stations 110.

A TRP 308 may be a distributed unit (DU). A TRP 308 may be connected to a single ANC 302 or multiple ANCs 302. For example, for RAN sharing, radio as a service (RaaS), and service specific AND deployments, the TRP 308 may be connected to more than one ANC 302. A TRP 308 may include one or more antenna ports. The TRPs 308 may be configured to individually (e.g., using dynamic selection) or jointly (e.g., using joint transmission) serve traffic to a UE 120.

In some aspects, multiple TRPs 308 may transmit communications (e.g., the same communication or different communications) in the same TTI or different TTIs (e.g., slots, mini-slots, and/or the like) using different QCL relationships (e.g., different spatial parameters, different transmission configuration indicator (TCI) states, different precoding parameters, different beamforming parameters, and/or the like).

The local architecture of RAN 300 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 310 may support dual connectivity with NR. The NG-AN 310 may share a common fronthaul for LTE and NR. The architecture may enable cooperation between and among TRPs 308. For example, cooperation may be preset within a TRP 308 and/or across TRPs 308 via the ANC 302. In some aspects, no inter-TRP interface may be needed/present.

In some aspects, a dynamic configuration of split logical functions may be present within the architecture of RAN 300. The packet data convergence protocol (PDCP), radio link control (RLC), media access control (MAC) protocol, and/or the like may be adaptably placed at the ANC 302 or TRP 308. According to various aspects, a base station 110 may include a central unit (CU) (e.g., ANC 302) and/or one or more distributed units (e.g., one or more TRPs 308).

As indicated above, FIG. 3 is provided merely as an example. Other examples may differ from what was described with regard to FIG. 3.

Figure 4:
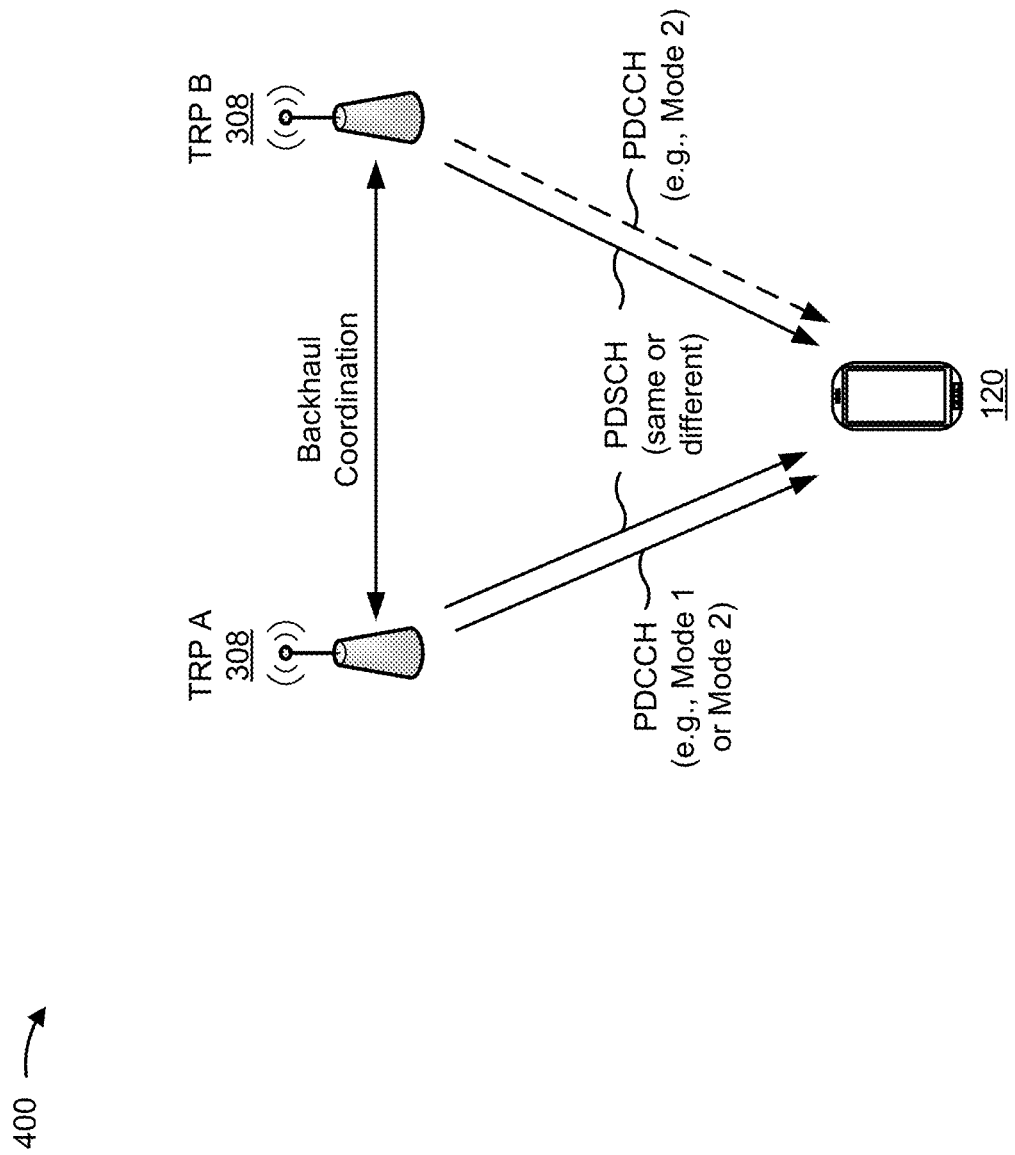
FIG. 4 is a diagram illustrating an example of multi-TRP communication, in accordance with various aspects of the present disclosure.

FIG. 4 is a diagram illustrating an example 400 of multi-TRP communication (sometimes referred to as multi-panel communication), in accordance with various aspects of the present disclosure.

As shown in FIG. 4, multiple TRPs 308 (shown as TRP A and TRP B) may communicate with the same UE 120 in a coordinated manner (e.g., using coordinated multipoint transmissions and/or the like) to improve reliability, increase throughput, and/or the like. The TRPs 308 may coordinate such communications via a backhaul, which may have a smaller delay and/or higher capacity when the TRPs 308 are co-located at the same base station 110 (e.g., different antenna arrays of the same base station 110), or may have a larger delay and/or lower capacity (as compared to co-location) when the TRPs 308 are located at different base stations 110. The different TRPs 308 may communicate with the UE 120 using different QCL relationships, different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 308 (e.g., TRP A and TRP B) may transmit communications to the UE 120 on the same PDSCH. For example, a communication may be transmitted using a single codeword with different spatial layers for different TRPs 308 (e.g., where one codeword maps to a first set of layers transmitted by a first TRP 308 and maps to a second set of layers transmitted by a second TRP 308). As another example, a communication may be transmitted using multiple codewords, where different codewords are transmitted by different TRPs 308 (e.g., using different sets of layers). In either case, different TRPs 308 may use different QCL relationships for different DMRS ports corresponding to different layers. For example, a first TRP 308 may use a first QCL relationship for a first set of DMRS ports corresponding to a first set of layers, and a second TRP 308 may use a second (different) QCL relationship for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship and the second QCL relationship.

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 308, and a second PDCCH may schedule a second codeword to be transmitted by a second TRP 308. Furthermore, first DCI (e.g., transmitted by the first TRP 308) may schedule a first PDSCH communication associated with a first set of DMRS ports with a first QCL relationship for the first TRP 308, and second DCI (e.g., transmitted by the second TRP 308) may schedule a second PDSCH communication associated with a second set of DMRS ports with a second QCL relationship for the second TRP 308. In this case, DCI (e.g., having DCI format 1_0, DCI format 1_1, and/or the like) may indicate a corresponding TCI state for a TRP 308 corresponding to the DCI.

In a multi-TRP communication scenario, performance may be improved by enabling the UE 120 to identify a TRP 308 from which a communication was received. For example, if the UE 120 can identify the TRP 308 that transmitted a communication, then the UE 120 can transmit TRP-specific acknowledgement (ACK) or negative acknowledgement (NACK) (ACK/NACK) feedback for the communication to the identified TRP 308. This may conserve network resources, UE resources (e.g., memory resources, processing resources, battery power, and/or the like), base station and/or TRP resources (e.g., memory resources, processing resources, and/or the like), and/or the like that would otherwise be used to transmit ACK/NACK feedback to multiple TRPs 308 and/or receive the ACK/NACK feedback at multiple TRPs 308. Additionally, or alternatively, the UE 120 may be configured to operate in a mode where ACK/NACK feedback is sent to multiple TRPs 308 (e.g., based at least in part on an ability of the UE 120 to identify the TRPs 308 to which the ACK/NACK feedback is to be sent), which may improve reliability. Additionally, or alternatively, if the UE 120 can identify a TRP 308, then the UE 120 may be capable of detecting and/or reporting errors associated with a TRP 308.

Some techniques and apparatuses described herein use HARQ process partitioning to improve performance in a multi-TRP communication scenario. For example, some techniques and apparatuses described herein permit a UE 120 to identify a TRP 308 associated with a communication based at least in part on a HARQ process associated with the communication. In this case, the total number of HARQ processes supported by the UE 120 can be shared across the multiple TRPs 308 to improve performance.

A HARQ process may be associated with a data communication (e.g., a PDSCH communication), such as by using a HARQ process identifier (ID). The HARQ process ID of the data communication may be indicated to the UE 120, such as in a downlink grant, DCI, and/or the like. When the UE 120 experiences an error with reception of the data communication, the UE 120 may store received data in a buffer (e.g., referred to as a soft buffer), and may associate the HARQ process ID with the buffer. The same HARQ process ID may be used for one or more retransmissions of the data communication so that the UE 120 can associate data included in the retransmission(s) with the data stored in the soft buffer (e.g., the data from the original communication and/or any prior retransmissions). This permits the UE 120 to combine the retransmitted data with the buffered data (e.g., using soft combining or another technique to combine data from multiple transmissions, which may include different redundancy versions of the data communication), thereby improving decoding performance.

The memory of the UE 120 may include multiple such soft buffers, and each soft buffer may be associated with a different HARQ process. Thus, the number of soft buffers of the UE 120 may dictate the total number of HARQ processes supported by the UE 120. Typically, the size of each soft buffer is the same (e.g., each soft buffer is capable of storing the same number of bits). Some techniques and apparatuses described herein use HARQ process partitioning to allow the UE 120 to use soft buffers of different sizes (e.g., storing a different number of bits), and to assign soft buffers to HARQ processes depending on a HARQ process type of the HARQ process. The HARQ process type may indicate one or more characteristics of the HARQ process, which may be used by the UE 120 to determine whether a smaller soft buffer or a larger soft buffer should be used for the HARQ process. In this way, the UE 120 may support a greater number of HARQ processes using the same amount of memory as compared to using soft buffers of equal sizes, or may support the same number of HARQ processes using less memory (e.g., thereby conserving memory and/or battery power of the UE 120). Additional details are described below.

As indicated above, FIG. 4 is provided as an example. Other examples may differ from what is described with respect to FIG. 4.

Figure 5:
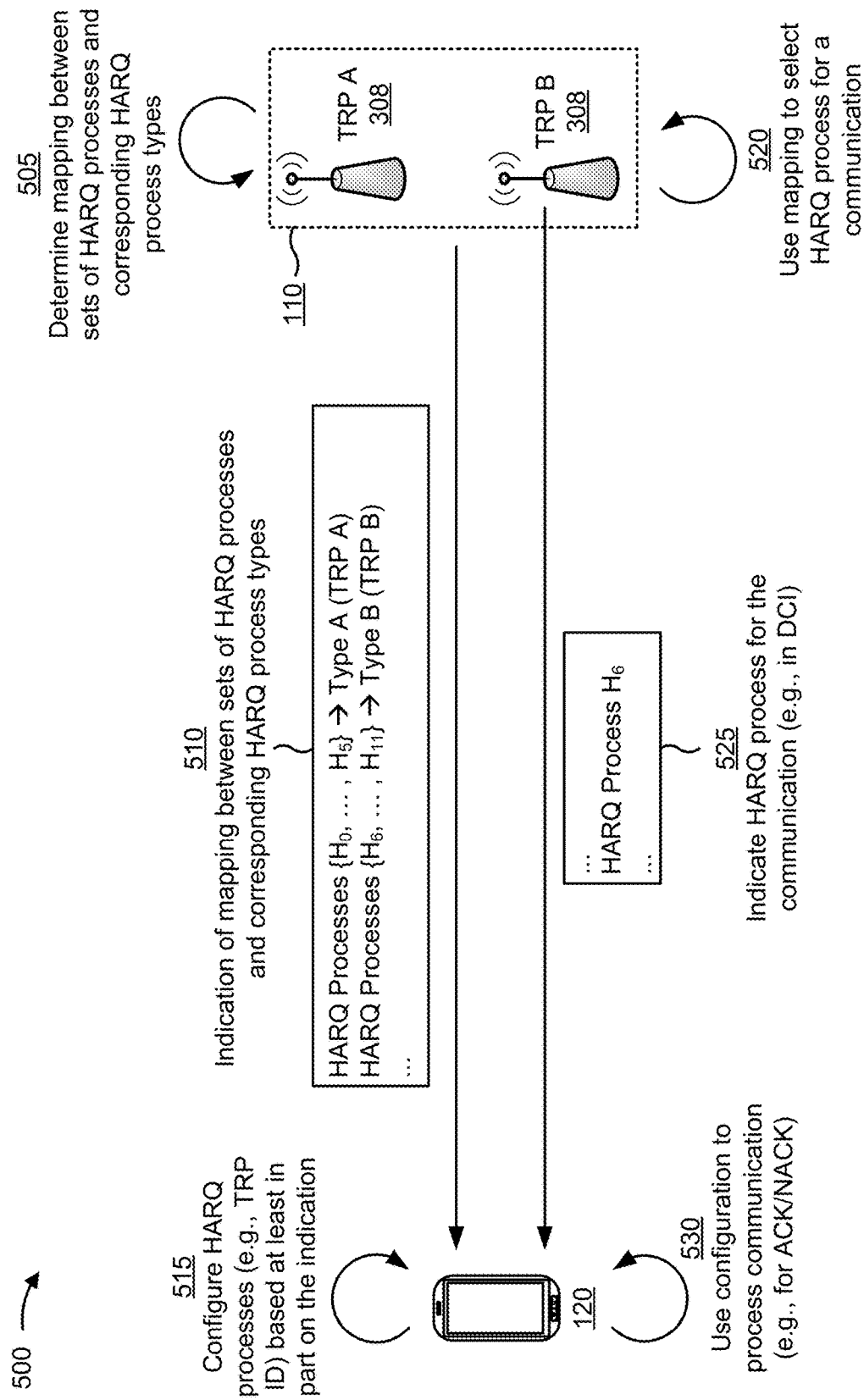
FIGS. 5-8 are diagrams illustrating examples of HARQ process partitioning, in accordance with various aspects of the present disclosure.

FIG. 5 is a diagram illustrating an example 500 of HARQ process partitioning, in accordance with various aspects of the present disclosure.

As shown in FIG. 5, multiple TRPs 308 (shown as TRP A and TRP B) may communicate with a UE 120. In some aspects, the multiple TRPs 308 may be included in a single base station 110. In some aspects, different TRPs 308, of the multiple TRPs 308, may be included in different base stations 110. Although two TRPs 308 are shown as communicating with the UE 120, in some aspects, a different number of TRPs 308 (e.g., three TRPs 308, four TRPs 308, and/or the like) may communicate with the UE 120 in a multi-TRP mode, sometimes referred to as a multi-panel mode. Some operations are described herein as being performed by a base station 110. Such operations may be performed by a single TRP 308 included in the base station 110 or by multiple TRPs 308 included in the base station 110. As used herein, "TRP" may be used interchangeably with "panel."

As shown by reference number 505, the base station 110 may determine a mapping (e.g., an association, a relationship, and/or the like) between a plurality of sets of HARQ processes and a corresponding plurality of HARQ process types. For example, the base station 110 may determine that a first set of HARQ processes maps to a first HARQ process type, a second set of HARQ processes maps to a second HARQ process type, and/or the like. A set of HARQ processes may refer to one or more HARQ processes (e.g., identified by a corresponding one or more HARQ process IDs).

A HARQ process type may indicate one or more characteristics of the HARQ process. For example, as described in connection with FIGS. 5 and 6, a HARQ process type may identify a TRP 308 associated with the HARQ process (e.g., a TRP 308 that transmitted a communication associated with the HARQ process ID of the HARQ process), may indicate whether a communication associated with the HARQ process was scheduled by a single TRP 308 (e.g., for a single communication) or multiple TRPs 308 (e.g., for simultaneous communications), and/or the like. Additionally, or alternatively, as described in connection with FIG. 7, a HARQ process type may indicate a maximum rank associated with the HARQ process (e.g., a maximum rank supported for communications associated with a HARQ process ID of the HARQ process), a number of codewords associated with the HARQ process (e.g., a number of codewords supported for communications associated with a HARQ process ID of the HARQ process), and/or the like.

In some aspects, the base station 110 may determine the mapping based at least in part on a capability report received from the UE 120, as described in more detail below in connection with FIG. 8. For example, the capability report may indicate a total number of HARQ processes supported by the UE 120, and the base station 110 may partition the total number of HARQ processes into multiple sets of HARQ processes. The base station 110 may associate (e.g., map) each set of HARQ processes to a HARQ process type.

The base station 110 may store information regarding the association (e.g., the mapping) in memory, and may use such information for future operations (e.g., for determining a HARQ process to be associated with a communication, for interpreting ACK/NACK feedback, for processing retransmissions, and/or the like).

In some aspects, the base station 110 may generate the sets of HARQ processes (e.g., by determining a number of sets, a number of HARQ processes included in each set, and/or the like) and/or may map the sets of HARQ processes to HARQ process types (e.g., by determining a number of HARQ processes to be associated with each HARQ process type) based at least in part on a UE capability (as described in more detail elsewhere herein), a multi-TRP communication mode, a characteristic of one or more radio links between the UE 120 and one or more TRPs 308, a network traffic load, a volume of network traffic associated with the UE 120, and/or the like.

As shown by reference number 510, the base station 110 may transmit, and the UE 120 may receive, an indication of the mapping between the plurality of sets of HARQ processes and the corresponding plurality of HARQ process types. In some aspects, the indication may be transmitted and/or received in a radio resource control (RRC) message, such as an RRC configuration message, an RRC reconfiguration message, and/or the like.

In some aspects, a HARQ process type may identify a TRP 308 associated with HARQ processes that map to the HARQ process type. For example, the mapping may indicate a first set of HARQ processes (shown as HARQ processes $H_0$ through $H_5$) that map to a first HARQ process type (shown as Type A), which indicates that the first set of HARQ processes is associated with a first TRP (shown as TRP A). Similarly, the mapping may indicate a second set of HARQ processes (shown as HARQ processes $H_6$ through $H_{11}$) that map to a second HARQ process type (shown as Type B), which indicates that the second set of HARQ processes is associated with a second TRP (shown as TRP B). Thus, different HARQ process types may correspond to different TRPs 308.

In some aspects, the HARQ process type may indicate that a set of HARQ processes, associated with the HARQ process type, are reserved for use by only a specific TRP 308 in communication with the UE 120, and are not permitted to be used by any other TRPs 308 in communication with the UE 120. In example 500, the first TRP is permitted to use the first set of HARQ processes (e.g., by selecting a HARQ process, from the set, for a communication), and the second TRP is not permitted to use the first set of HARQ processes. Similarly, the second TRP is permitted to use the second set of HARQ processes, and the first TRP is not permitted to use the second set of HARQ processes. In some aspects, the first set of HARQ processes and the second set of HARQ processes may be disjoint (e.g., mutually exclusive) sets. In this way, the UE 120 may be capable of using a HARQ process ID of a communication to identify a TRP 308 that transmitted the communication.

As shown by reference number 515, the UE 120 may configure one or more HARQ processes of the UE 120 based at least in part on the indication of the mapping. For example, the UE 120 may store information that identifies the mapping, may map soft buffers of the UE 120 to corresponding HARQ processes (e.g., and a corresponding TRP 308), may identify a TRP 308 associated with a communication based at least in part on the HARQ process associated with the communication, and/or the like.

As shown by reference number 520, the base station 110 may select a HARQ process to be used for a communication with the UE 120 based at least in part on the mapping. In some aspects, the HARQ process may be selected from a set of HARQ processes of the plurality of sets of HARQ processes. For example, the base station 110 may determine a characteristic associated with the communication, such as a TRP 308 to be used to transmit the communication, and may identify a set of HARQ processes based at least in part on the characteristic. The base station 110 may then select a HARQ process from the set. In example 500, the communication will be transmitted by TRP B. Thus, the base station 110 (e.g., TRP B) may select a HARQ process from the second set of HARQ processes, which are associated with TRP B.

As shown by reference number 525, the base station 110 (e.g., TRP B in example 500) may transmit, and the UE 120 may receive, an indication of a HARQ process associated with the communication. For example, the base station 110 may schedule the communication using DCI, and may indicate, in the DCI, a HARQ process ID for the communication. In example 500, the base station 110 selects HARQ process $H_6$, which is selected from the second set of HARQ processes that includes HARQ process $H_6$ through $H_{11}$, and indicates HARQ process $H_6$ to the UE 120 for the scheduled communication. In some aspects, the communication may be scheduled using a message other than DCI (e.g., using configured scheduling, semi-persistent scheduling, and/or the like), and the base station 110 may indicate the HARQ process to the UE 120 using an appropriate scheduling technique. After scheduling the communication, the base station 110 may transmit the communication to the UE 120 (e.g., according to scheduling information transmitted to the UE 120).

As shown by reference number 530, the UE 120 may process the communication based at least in part on configuring one or more HARQ processes. For example, the UE 120 may store data received in the communication in a soft buffer associated with the indicated HARQ process (e.g., and associated with the TRP 308 that transmitted the communication). Additionally, or alternatively, the UE 120 may use the indicated HARQ process to identify a TRP 308 that transmitted the communication, and may process the communication based at least in part on identifying the TRP 308.

For example, the UE 120 may transmit ACK/NACK feedback, corresponding to the communication, to the identified TRP 308. In example 500, the UE 120 may transmit such ACK/NACK feedback to TRP B, and not to TRP A, thereby conserving network resources, UE resources, and base station resources as compared to transmitting the ACK/NACK feedback to TRP A and TRP B. Additionally, or alternatively, if the UE 120 is operating in a mode where ACK/NACK feedback is transmitted to multiple TRPs 308, then the UE 120 may use the mapping to identify the multiple TRPs 308, and may transmit the ACK/NACK feedback to the multiple TRPs 308 to improve reliability.

Additionally, or alternatively, if a connection with TRP B is lost (e.g., due to radio link failure and/or the like), the UE 120 may be capable of identifying another TRP 308 in communication with the UE 120 (e.g., based at least in part on the TRPs 308 identified in the mapping), such as TRP A, and transmitting the ACK/NACK feedback to TRP A. In some aspects, TRP A may communicate with TRP B to coordinate communications, and may retransmit the communication to the UE 120. In example 500, TRP A may be required to use a different HARQ process for the retransmission, so the UE 120 would not be able to use soft combining to improve decoding performance. However, the UE 120 may still be able to receive, in the retransmission by TRP A, data that was included in the failed communication from TRP B, thereby improving performance. In some aspects, the mapping may indicate a set of HARQ processes that are permitted to be used by multiple TRPs 308 (e.g., TRP A and TRP B), as is described in more detail below in connection with FIG. 6.

As indicated above, FIG. 5 is provided as an example. Other examples may differ from what is described with respect to FIG. 5.

Figure 6:
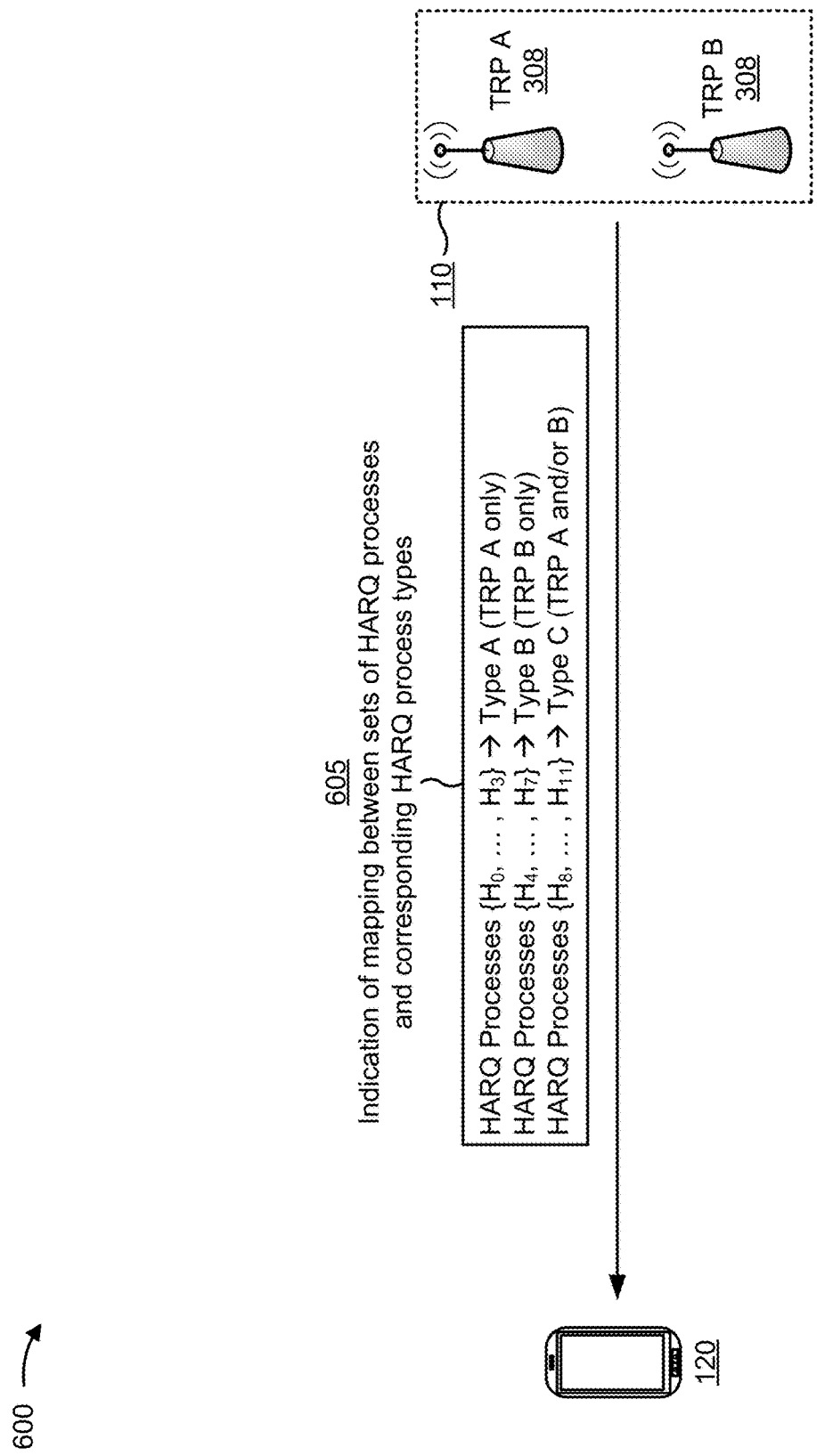

FIG. 6 is a diagram illustrating another example 600 of HARQ process partitioning, in accordance with various aspects of the present disclosure.

As shown by reference number 605, the base station 110 may transmit, and the UE 120 may receive, an indication of the mapping between the plurality of sets of HARQ processes and the corresponding plurality of HARQ process types, in a similar manner as described above in connection with FIG. 5.

As described above in connection with FIG. 5, a HARQ process type may identify a TRP 308 associated with HARQ processes that map to the HARQ process type. Additionally, or alternatively, a HARQ process type may identify multiple TRPs 308 associated with HARQ processes that map to the HARQ process type. For example, the mapping may indicate a first set of HARQ processes (shown as HARQ processes $H_0$ through $H_3$) that map to a first HARQ process type (shown as Type A), which indicates that the first set of HARQ processes is associated with a first TRP (shown as TRP A). Similarly, the mapping may indicate a second set of HARQ processes (shown as HARQ processes $H_4$ through $H_7$) that map to a second HARQ process type (shown as Type B), which indicates that the second set of HARQ processes is associated with a second TRP (shown as TRP B). Furthermore, the mapping may indicate a third set of HARQ processes (shown as HARQ processes $H_8$ through $H_{11}$) that map to a third HARQ process type (shown as Type C), which indicates that the third set of HARQ processes is associated with both the first TRP and the second TRP (e.g., TRP A and TRP B). Thus, different HARQ process types may correspond to different TRPs 308 and/or different sets of TRPs 308.

As described above in connection with FIG. 5, a HARQ process type may indicate that a set of HARQ processes, associated with the HARQ process type, are reserved for use by only a specific TRP 308 in communication with the UE 120, and are not permitted to be used by any other TRPs 308 in communication with the UE 120. Additionally, or alternatively, a HARQ process type may indicate that a set of HARQ processes, associated with the HARQ process type, are permitted to be used by the first TRP, the second TRP, or both the first TRP and the second TRP. In this case, the set of HARQ processes may include a common pool of HARQ processes permitted to be used by any of the TRPs 308 that map to (e.g., that are associated with) the set of HARQ processes.

In example 600, the first TRP is permitted to use the first set of HARQ processes, and the second TRP is not permitted to use the first set of HARQ processes. Similarly, the second TRP is permitted to use the second set of HARQ processes, and the first TRP is not permitted to use the second set of HARQ processes. However, both the first TRP and the second TRP are permitted to use the third set of HARQ processes. In some aspects, the first set of HARQ processes, the second set of HARQ processes, and the third set of HARQ processes may all be disjoint (e.g., mutually exclusive) sets. In this way, if the UE 120 receives a communication associated with a HARQ process selected from the first set of HARQ processes or the second set of HARQ processes, then the UE 120 may be capable of using a HARQ process ID associated with the communication to identify a TRP 308 that transmitted the communication. If the UE 120 receives a communication associated with a HARQ process selected from the third set of HARQ processes, then the UE 120 may use other information (e.g., in addition to the HARQ process or independent of the HARQ process) to identify the TRP 308 that transmitted the communication, such as a quasi co-location (QCL) indication, a transmission configuration indicator (TCI) state, and/or the like.

When a set of HARQ processes are permitted to be used by multiple TRPs 308, this may increase the number of HARQ processes available for use by a single TRP (e.g., in a single TRP communication mode, when a connection with a TRP 308 is lost in a multi-TRP communication mode, and/or the like). For example, in the mapping of example 600, if the UE 120 loses a connection with TRP B, then TRP A will have 8 out of 12 HARQ processes available for communication (e.g., HARQ processes $H_0$ through $H_3$ and $H_8$ through $H_{11}$), which may improve performance as compared to a mapping where each set of HARQ processes is reserved for a single TRP 308 (e.g., as described above in connection with FIG. 5, where there would be only 6 out of 12 HARQ processes, $H_0$ through $H_5$, available for TRP A if the UE 120 loses a connection with TRP B).

In some aspects, when a HARQ process type is associated with multiple TRPs 308, the HARQ process type may indicate that a set of HARQ processes, associated with the HARQ process type, are reserved for simultaneous communications of the multiple TRPs 308. In this case, a HARQ process from the set of HARQ processes is permitted to be used by one or more TRPs 308, of the multiple TRPs 308, only for simultaneous communications of those multiple TRPs 308. Simultaneous communications may refer to communications that are scheduled to be transmitted by multiple TRPs 308 using the same time and/or frequency resources (e.g., the same resource block(s), using different layers and/or other characteristics).

In example 600, if the third set of HARQ processes is reserved for simultaneous communications, then TRP A is permitted to use a HARQ process, selected from the third set of HARQ processes, only for a communication that is scheduled to occur simultaneously with a corresponding communication from TRP B (e.g., for a joint transmission and/or the like). Similarly, if the third set of HARQ processes is reserved for simultaneous communications, then TRP B is permitted to use a HARQ process, selected from the third set of HARQ processes, only for a communication that is scheduled to occur simultaneously with a corresponding communication from TRP A. In some aspects, the same HARQ process may be used by both TRP A and TRP B for the simultaneous communications (e.g., a first communication from TRP A and a second, corresponding, communication from TRP B).

Although FIG. 6 shows an operation that includes indicating a mapping between sets of HARQ processes and corresponding HARQ process types, other operations described elsewhere herein may be performed in connection with the mapping. For example, the base station 110 may determine the mapping, the UE 120 may configure one or more HARQ processes based at least in part on the mapping, the base station 110 may use the mapping to select a HARQ process for a communication, the base station 110 may indicate the selected HARQ process for the communication, the UE 120 may process the communication according to a HARQ process configuration, and/or the like, as described above in connection with FIG. 5.

In some aspects, if a set of HARQ processes is reserved for simultaneous communications, then the UE 120 may process the communication by determining whether a HARQ process, associated with the communication, is included in the set of HARQ processes reserved for simultaneous communications. If the HARQ process is included in the set of HARQ processes reserved for simultaneous communications, then the UE 120 may determine whether multiple communications (e.g., simultaneous communications) have been received by the UE 120. If the HARQ process indicates simultaneous communications, but the UE 120 receives only a single communication (or communications from fewer than all of the TRPs 308 associated with the HARQ process), then the UE 120 may detect an error. In some aspects, the UE 120 may report such an error to the base station 110 to assist with resolving the error.

As indicated above, FIG. 6 is provided as an example. Other examples may differ from what is described with respect to FIG. 6.

Figure 7:
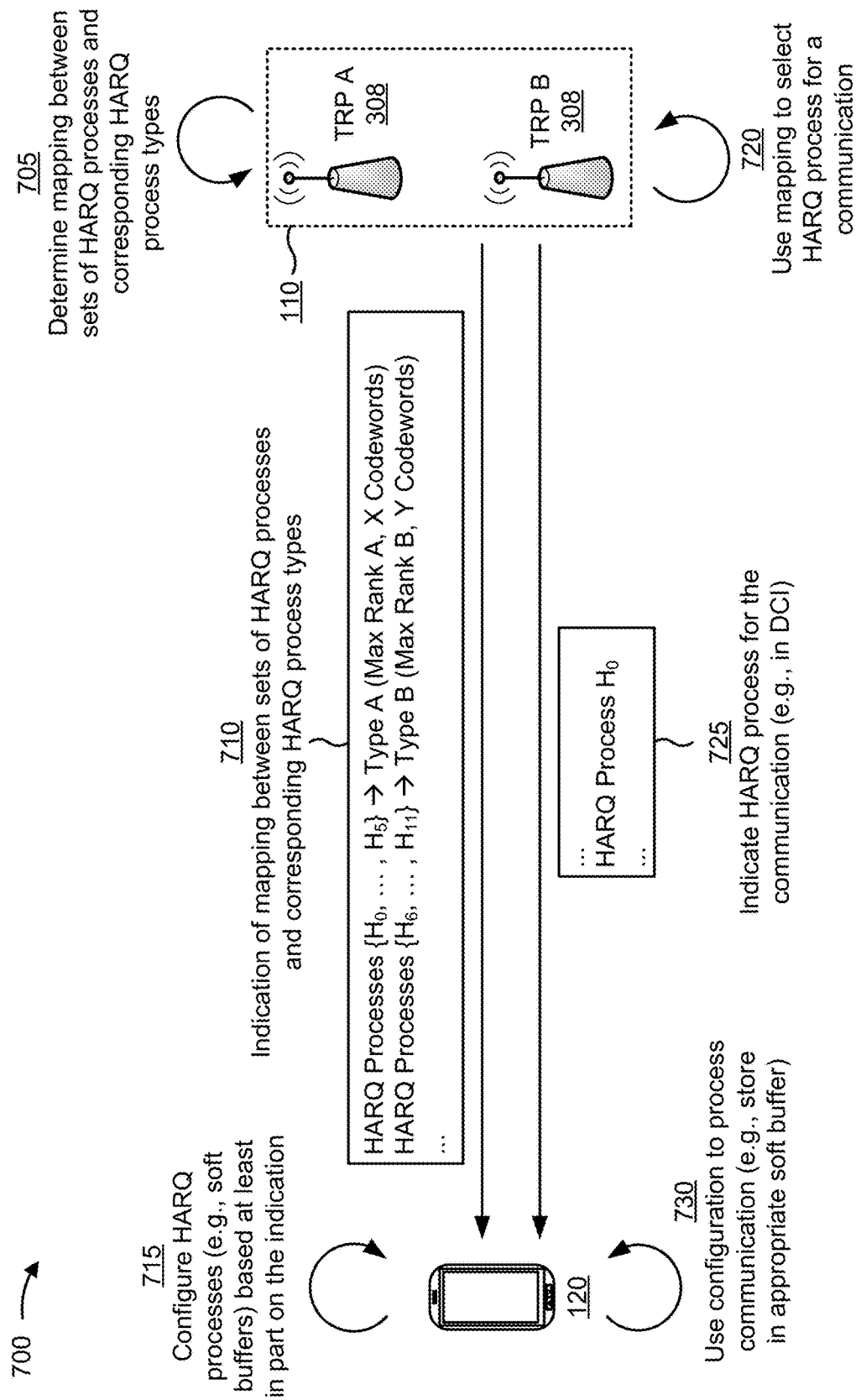

FIG. 7 is a diagram illustrating another example 700 of HARQ process partitioning, in accordance with various aspects of the present disclosure.

As shown by reference number 705, the base station 110 may determine a mapping between a plurality of sets of HARQ processes and a corresponding plurality of HARQ process types, in a similar manner as described above in connection with FIG. 5. In some aspects, a HARQ process type may indicate a maximum rank associated with the HARQ process (e.g., a maximum rank supported for communications associated with a HARQ process ID of the HARQ process), a number of codewords associated with the HARQ process (e.g., a number of codewords supported for communications associated with a HARQ process ID of the HARQ process), and/or the like. In some aspects, the base station 110 may determine the mapping based at least in part on a capability report received from the UE 120, as described in more detail below in connection with FIG. 8.

As shown by reference number 710, the base station 110 may transmit, and the UE 120 may receive, an indication of the mapping between the plurality of sets of HARQ processes and the corresponding plurality of HARQ process types, in a similar manner as described above in connection with FIG. 5. In some aspects, a HARQ process type may identify a maximum rank associated with HARQ processes that map to the HARQ process type, a number of codewords associated with HARQ processes that map to the HARQ process type, and/or the like.

For example, the mapping may indicate a first set of HARQ processes (shown as HARQ processes $H_0$ through $H_5$) that map to a first HARQ process type (shown as Type A), which indicates that the first set of HARQ processes is associated with a first maximum rank (shown as Max Rank A) and/or a first number of codewords (shown as X Codewords). Similarly, the mapping may indicate a second set of HARQ processes (shown as HARQ processes $H_6$ through $H_{11}$) that map to a second HARQ process type (shown as Type B), which indicates that the second set of HARQ processes is associated with a second maximum rank (shown as Max Rank B) and/or a second number of codewords (shown as Y Codewords). A maximum rank may refer to a maximum number of layers permitted to be used for a communication. For example 700, Max Rank A is greater than Max Rank B, and X is greater than Y.

In some aspects, the HARQ process type may indicate that a set of HARQ processes, associated with the HARQ process type, are reserved for use with communications having a rank (or a maximum rank) and/or a number of codewords that satisfies a threshold, and are not permitted to be used with communications having a rank (or a maximum rank) and/or a number of codewords that does not satisfy the threshold. In example 700, the first set of HARQ processes is permitted to be used for communications having a rank and/or a number of codewords that is satisfies a threshold (e.g., a rank higher than a threshold, a number of codewords greater than a threshold, and/or the like), and is not permitted to be used for communications having a rank and/or a number of codewords that does not satisfy the threshold. Similarly, the second set of HARQ processes is permitted to be used for communications having a rank and/or a number of codewords that does not satisfy the threshold (e.g., a rank lower than a threshold, a number of codewords less than a threshold, and/or the like), and is not permitted to be used for communications having a rank and/or a number of codewords that satisfies the threshold. In some aspects, the first set of HARQ processes and the second set of HARQ processes may be disjoint (e.g., mutually exclusive) sets. In this way, the UE 120 may be capable of using a HARQ process ID of a communication to identify a required size of a soft buffer to be used to store data from the communication (e.g., because a size of the soft buffer dictates the maximum rank and/or the number of codewords supported by the soft buffer), as described in more detail below.

As shown by reference number 715, the UE 120 may configure one or more HARQ processes of the UE 120 based at least in part on the indication of the mapping. For example, the UE 120 may map soft buffers of the UE 120 to corresponding HARQ processes based at least in part on the indication of the mapping. For example, the UE 120 may store an indication that larger soft buffers are to be used for the first set of HARQ processes (e.g., that support a higher maximum rank and/or a larger number of codewords) and/or that smaller soft buffers are to be used for the second set of HARQ processes (e.g., that support a lower maximum rank and/or a smaller number of codewords).

As shown by reference number 720, the base station 110 may select a HARQ process to be used for a communication with the UE 120 based at least in part on the mapping, in a similar manner as described above in connection with FIG. 5. For example, the base station 110 may determine a characteristic associated with the communication, such as a maximum rank, a rank, and/or a number of codewords to be used to transmit the communication, and may identify a set of HARQ processes based at least in part on the characteristic. The base station 110 may then select a HARQ process from the set. In example 700, the communication has a rank and/or a number of codewords that is greater than or equal to a threshold (e.g., a predetermined threshold, a preconfigured threshold, a threshold indicated in the mapping, and/or the like). Thus, the base station 110 may select a HARQ process from the first set of HARQ processes.

As shown by reference number 725, the base station 110 may transmit, and the UE 120 may receive, an indication of a HARQ process associated with the communication, in a similar manner as described above in connection with FIG. 5. In example 700, the base station 110 selects HARQ process $H_0$, which is selected from the first set of HARQ processes that includes HARQ process $H_0$ through $H_5$, and indicates HARQ process $H_0$ to the UE 120 for the scheduled communication. After scheduling the communication, the base station 110 may transmit the communication to the UE 120.

As shown by reference number 730, the UE 120 may process the communication based at least in part on configuring one or more HARQ processes. For example, the UE 120 may store data received in the communication in a soft buffer associated with the indicated HARQ process. For example, the UE 120 may configure the one or more HARQ processes such that the first set of HARQ processes is associated with a first set of soft buffers having a first size (e.g., a larger size, or more bits). Additionally, or alternatively, the UE 120 may configure the one or more HARQ processes such that the second set of HARQ processes is associated with a second set of soft buffers having a second size (e.g., a smaller size, or fewer bits).

By using soft buffers of different sizes, and by associating soft buffers with HARQ processes based at least in part on transmission characteristics of communications associated with those HARQ processes (e.g., a rank, a maximum rank, a number of codewords, and/or the like), the UE 120 may be capable of supporting more HARQ processes using the same amount of memory as compared to using soft buffers of equal sizes, thereby improving performance. Additionally, or alternatively, the UE 120 may be capable of supporting the same number of HARQ processes using less memory as compared to using soft buffers of equal sizes, thereby conserving resources of the UE 120 (e.g., memory resources, battery power, and/or the like).

In some aspects, partitioning of HARQ processes based at least in part on a maximum rank and/or a number of codewords, as described in connection with FIG. 7, may be used in a single TRP mode. In some aspects, such partitioning of HARQ processes may be used in a multi-TRP mode (e.g., where each TRP schedules and/or transmits a single codeword).

Although example 700 is described as using two sets of HARQ processes (and two HARQ process types), more than two sets of HARQ processes may be used to partition HARQ process, in some aspects. In this case, different HARQ process types may be associated with different sets of HARQ processes that support different maximum ranks and/or numbers of codewords. For example, a first HARQ process type may correspond to HARQ processes that support a transmission characteristic that is less than or equal to a first threshold (e.g., a maximum rank that is less than or equal to 2), a second HARQ process type may correspond to HARQ processes that support a transmission characteristic that is greater than the a first threshold and less than a second threshold (e.g., a maximum rank that is greater than 2 but less than 5), a third HARQ process type may correspond to HARQ processes that support a transmission characteristic that is greater than or equal to the second threshold (e.g., a maximum rank that is greater than or equal to 5), and/or the like. In this case, more than two soft buffer sizes may be used, thereby providing further flexibility in configuring HARQ processes and further improving a memory footprint of the soft buffers of the UE 120.

As indicated above, FIG. 7 is provided as an example. Other examples may differ from what is described with respect to FIG. 7.

Figure 8:
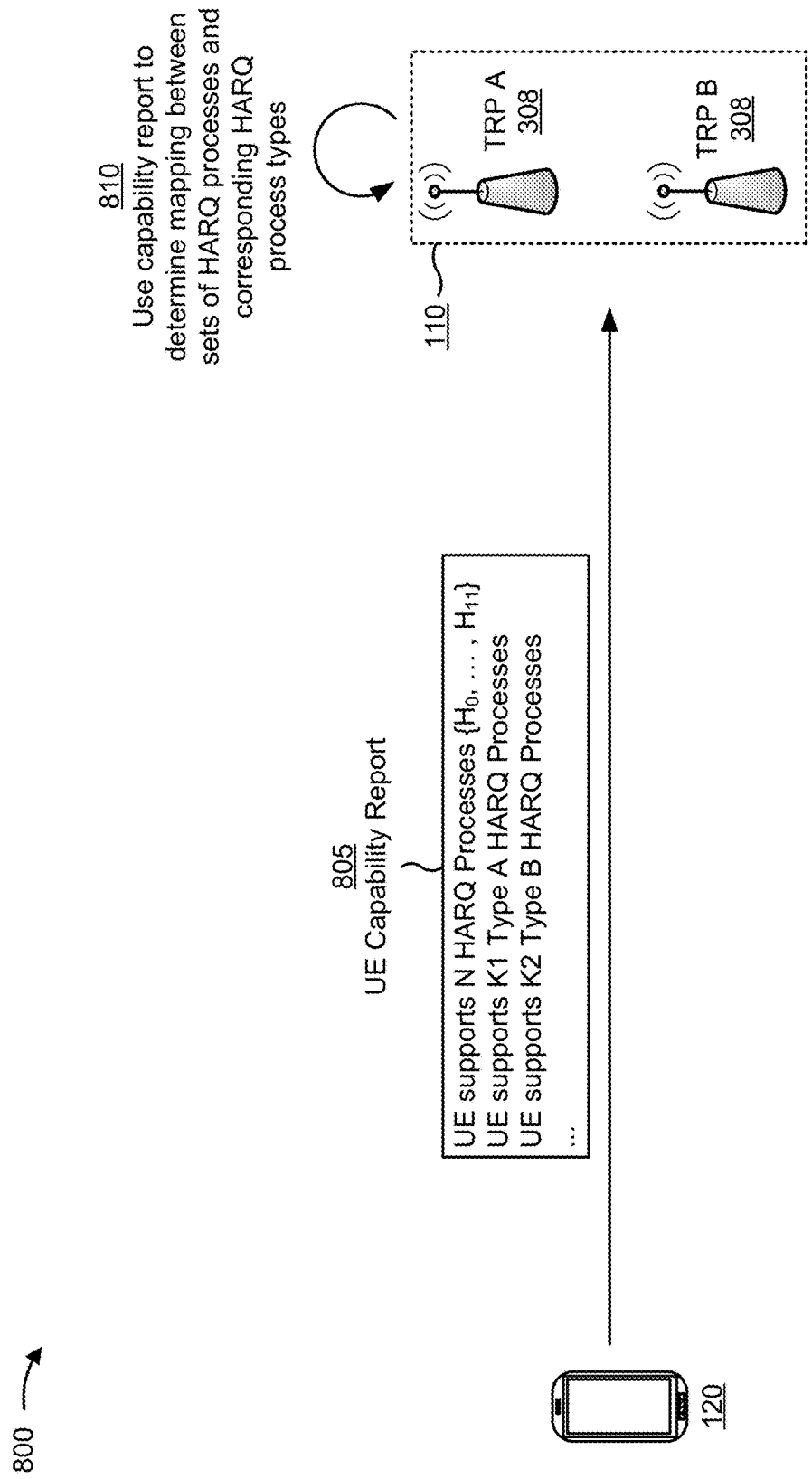

FIG. 8 is a diagram illustrating another example 800 of HARQ process partitioning, in accordance with various aspects of the present disclosure.

As shown by reference number 805, the UE 120 may transmit, and the base station 110 may receive, a capability report (e.g., a UE capability report) indicating a number of HARQ processes supported by the UE 120 for one or more of a plurality of HARQ process types. For example, the UE 120 may indicate a total number of HARQ processes supported by the UE 120 (shown as $H_0$ through $H_{11}$), a number of HARQ processes of a first type supported by the UE 120 (e.g., shown as K1 Type A HARQ processes), a number of HARQ processes of a second type supported by the UE 120 (e.g., shown as K2 Type B HARQ processes), and/or the like.

As shown by reference number 810, the base station 110 may use the capability report to generate sets of HARQ processes, to determine HARQ process types supported by the UE 120, and/or to map sets of HARQ processes to HARQ process types. For example, the capability report may indicate a total number of HARQ processes supported by the UE 120, and the base station 110 may partition the total number of HARQ processes into multiple sets of HARQ processes. In some aspects, the base station 110 may partition the HARQ processes such that the number of HARQ processes, included in a set of HARQ processes that maps to a specific HARQ process type, does not exceed the number of HARQ processes that the UE 120 is capable of supporting for that HARQ process type.

After the mapping between the sets of HARQ processes and HARQ process types is determined, the base station 110 and/or the UE 120 may perform one or more other operations described herein (e.g., in connection with FIGS. 5-7). For example, the base station 110 may indicate the mapping to the UE 120, the UE 120 may configure one or more HARQ processes based at least in part on the mapping, the base station 110 may use the mapping to select a HARQ process for a communication, the base station 110 may indicate the selected HARQ process for the communication, the UE 120 may process the communication according to a HARQ process configuration, and/or the like.

By using the UE capability report to determine the mapping, the base station 110 may ensure that limitations of the UE 120 are not violated, thereby improving performance.

As indicated above, FIG. 8 is provided as an example. Other examples may differ from what is described with respect to FIG. 8.

Figure 9:
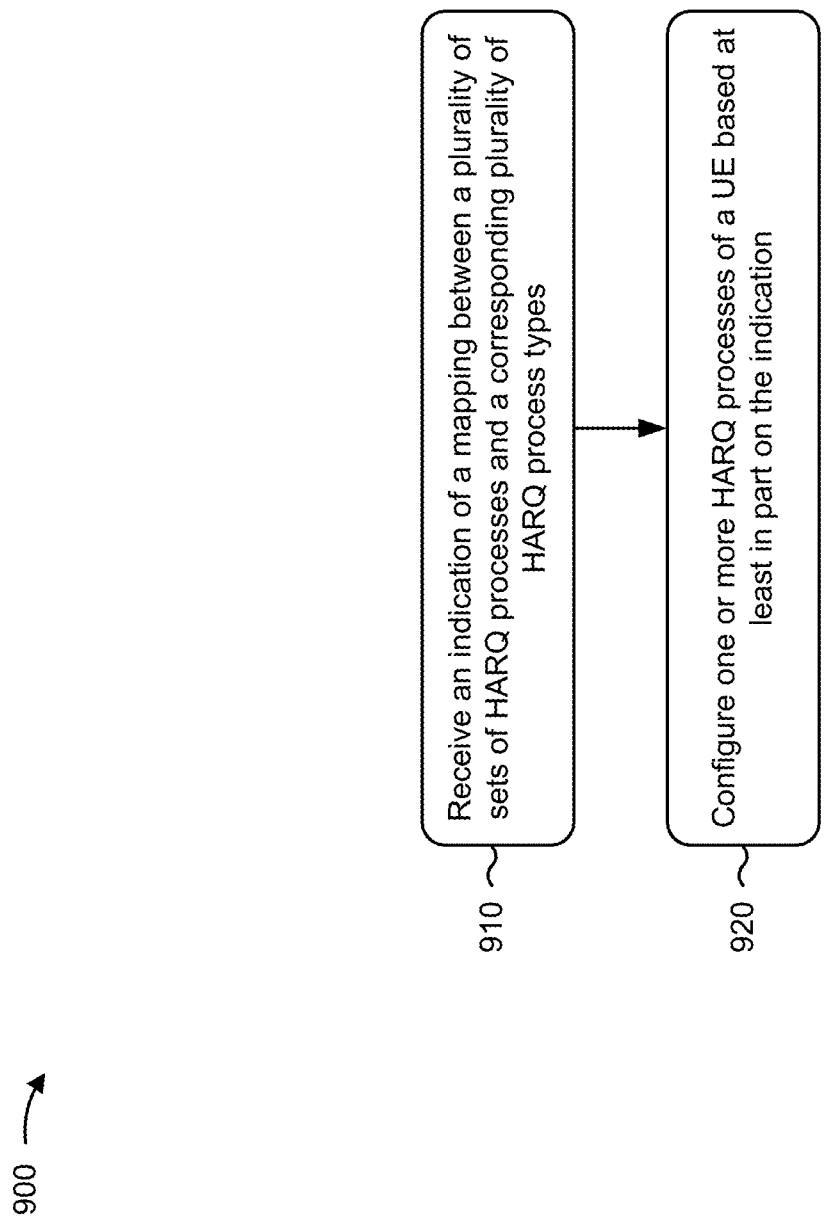
FIGS. 9 and 10 are diagrams illustrating example processes relating to HARQ process partitioning, in accordance with various aspects of the present disclosure.

FIG. 9 is a diagram illustrating an example process 900 performed, for example, by a UE, in accordance with various aspects of the present disclosure. Example process 900 is an example where a UE (e.g., UE 120 and/or the like) performs operations associated with HARQ process partitioning.

As shown in FIG. 9, in some aspects, process 900 may include receiving an indication of a mapping between a plurality of sets of HARQ processes and a corresponding plurality of HARQ process types (block 910). For example, the UE (e.g., using antenna 252, DEMOD 254, MIMO detector 256, receive processor 258, controller/processor 280, and/or the like) may receive an indication of a mapping between a plurality of sets of HARQ processes and a corresponding plurality of HARQ process types, as described above.

As further shown in FIG. 9, in some aspects, process 900 may include configuring one or more HARQ processes of the UE based at least in part on the indication (block 920). For example, the UE (e.g., using controller/processor 280 and/or the like) may configure one or more HARQ processes of the UE based at least in part on the indication, as described above.

Process 900 may include additional aspects, such as any single aspect and/or any combination of aspects described below and/or in connection with one or more other processes described elsewhere herein.

In a first aspect, configuring the one or more HARQ processes comprises mapping one or more soft buffers of the UE to the one or more HARQ processes based at least in part on the indication.

In a second aspect, alone or in combination with the first aspect, mapping the one or more soft buffers comprises mapping a first soft buffer to a first HARQ process having a first HARQ process type and mapping a second soft buffer to a second HARQ process having a second HARQ process type.

In a third aspect, alone or in combination with one or more of the first and second aspects, the first soft buffer and the second soft buffer have a different size.

In a fourth aspect, alone or in combination with one or more of the first through third aspects, different HARQ process types, of the plurality of HARQ process types, correspond to different TRPs.

In a fifth aspect, alone or in combination with one or more of the first through fourth aspects, the plurality of HARQ process types includes a first HARQ process type corresponding to a first set of HARQ processes that are permitted to be used by a first TRP and that are not permitted to be used by a second TRP, and a second HARQ process type corresponding to a second set of HARQ processes that are permitted to be used by the second TRP and that are not permitted to be used by the first TRP.

In a sixth aspect, alone or in combination with one or more of the first through fifth aspects, the plurality of HARQ process types includes a first HARQ process type corresponding to a first set of HARQ processes that are permitted to be used by a first TRP and that are not permitted to be used by a second TRP, a second HARQ process type corresponding to a second set of HARQ processes that are permitted to be used by the second TRP and that are not permitted to be used by the first TRP, and a third HARQ process type corresponding to a third set of HARQ processes that are permitted to be used by the first TRP, the second TRP, or both the first TRP and the second TRP.

In a seventh aspect, alone or in combination with one or more of the first through sixth aspects, the third set of HARQ processes are permitted to be used, by the first TRP or the second TRP, only for simultaneous communications of the first TRP and the second TRP.

In an eighth aspect, alone or in combination with one or more of the first through seventh aspects, the indication is received in an RRC message.

In a ninth aspect, alone or in combination with one or more of the first through eighth aspects, the plurality of HARQ process types includes a first HARQ process type corresponding to a first set of HARQ processes associated with a first maximum rank or a first number of codewords, and a second HARQ process type corresponding to a second set of HARQ processes, disjoint from the first set of HARQ processes, associated with a second maximum rank or a second number of codewords.

In a tenth aspect, alone or in combination with one or more of the first through ninth aspects, the UE is configured to report a UE capability regarding a number of HARQ processes supported by the UE for one or more of the plurality of HARQ process types.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
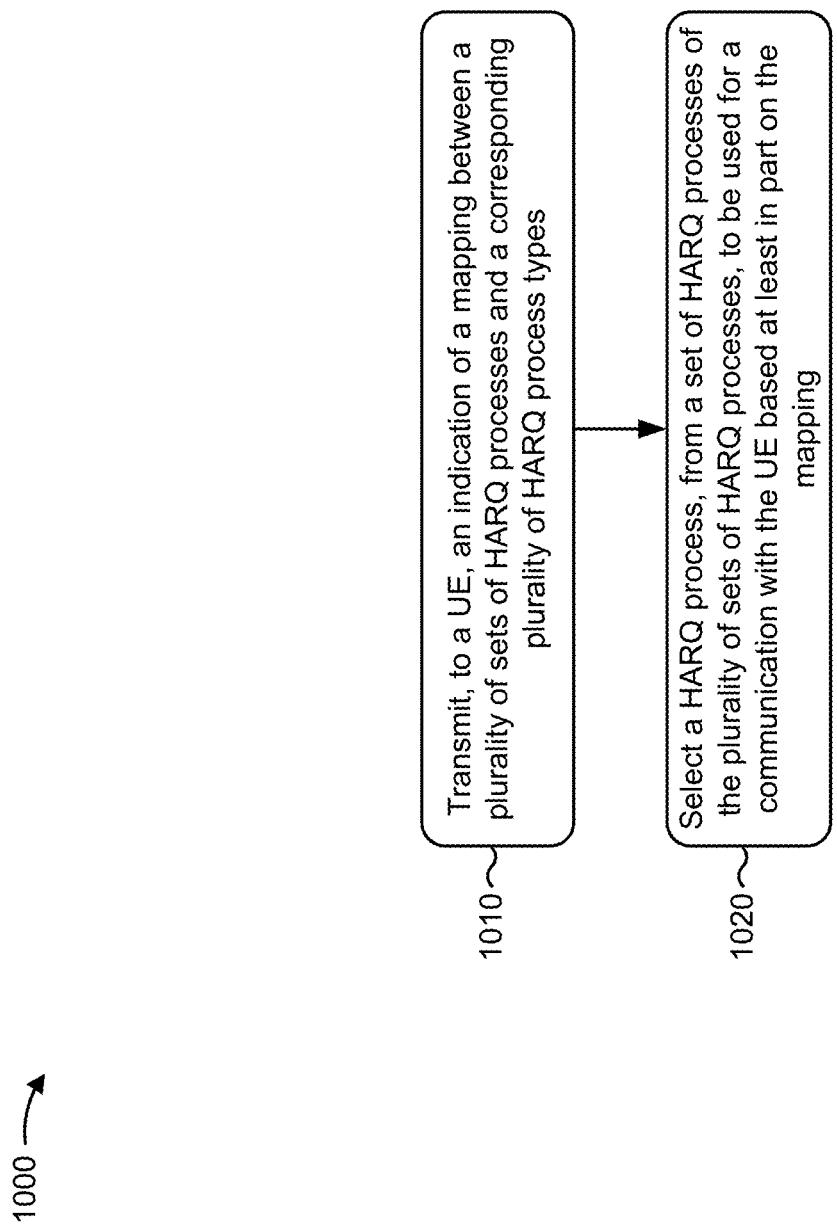

FIG. 10 is a diagram illustrating an example process 1000 performed, for example, by a base station, in accordance with various aspects of the present disclosure. Example process 1000 is an example where a base station (e.g., base station 110 and/or the like) performs operations associated with HARQ process partitioning.

As shown in FIG. 10, in some aspects, process 1000 may include transmitting, to a UE, an indication of a mapping between a plurality of sets of HARQ processes and a corresponding plurality of HARQ process types (block 1010). For example, the base station (e.g., using controller/processor 240, transmit processor 220, TX MIMO processor 230, MOD 232, antenna 234, and/or the like) may transmit, to an indication of a mapping between a plurality of sets of HARQ processes and a corresponding plurality of HARQ process types, as described above. In some aspects, the base station may transmit the indication to a UE.

As further shown in FIG. 10, in some aspects, process 1000 may include selecting a HARQ process, from a set of HARQ processes of the plurality of sets of HARQ processes, to be used for a communication with the UE based at least in part on the mapping (block 1020). For example, the base station (e.g., using controller/processor 240 and/or the like) may select a HARQ process to be used for a communication with the UE based at least in part on the mapping, as described above. In some aspects, the base station may select the HARQ process from a set of HARQ processes of the plurality of sets of HARQ processes.

Process 1000 may include additional aspects, such as any single aspect and/or any combination of aspects described below and/or in connection with one or more other processes described elsewhere herein.

In a first aspect, different HARQ process types, of the plurality of HARQ process types, correspond to different TRPs.

In a second aspect, alone or in combination with the first aspect, the plurality of HARQ process types includes a first HARQ process type corresponding to a first set of HARQ processes that are permitted to be used by a first TRP and that are not permitted to be used by a second TRP, and a second HARQ process type corresponding to a second set of HARQ processes that are permitted to be used by the second TRP and that are not permitted to be used by the first TRP.

In a third aspect, alone or in combination with one or more of the first and second aspects, the plurality of HARQ process types includes a first HARQ process type corresponding to a first set of HARQ processes that are permitted to be used by a first TRP and that are not permitted to be used by a second TRP, a second HARQ process type corresponding to a second set of HARQ processes that are permitted to be used by the second TRP and that are not permitted to be used by the first TRP, and a third HARQ process type corresponding to a third set of HARQ processes that are permitted to be used by the first TRP, the second TRP, or both the first TRP and the second TRP.

In a fourth aspect, alone or in combination with one or more of the first through third aspects, the third set of HARQ processes are permitted to be used, by the first TRP or the second TRP, only for simultaneous communications of the first TRP and the second TRP.

In a fifth aspect, alone or in combination with one or more of the first through fourth aspects, the indication is transmitted in an RRC message.

In a sixth aspect, alone or in combination with one or more of the first through fifth aspects, the plurality of HARQ process types includes a first HARQ process type corresponding to a first set of HARQ processes associated with a first maximum rank or a first number of codewords, and a second HARQ process type corresponding to a second set of HARQ processes, disjoint from the first set of HARQ processes, associated with a second maximum rank or a second number of codewords.

In a seventh aspect, alone or in combination with one or more of the first through sixth aspects, the mapping is determined based at least in part on a UE capability report indicating a number of HARQ processes supported by the UE for one or more of the plurality of HARQ process types.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of a mapping between a plurality of sets of hybrid automatic repeat request (HARQ) processes and a corresponding plurality of HARQ process types, wherein the corresponding plurality of HARQ process types includes:
      a first HARQ process type that identifies a first transmit receive point (TRP) associated with a first set of HARQ processes, of the plurality of sets of HARQ processes, that map to the first HARQ process type, and
      a second HARQ process type that identifies a second transmit receive point (TRP) associated with a second set of HARQ processes, of the plurality of sets of HARQ processes, that map to the second HARQ process type; and
   configuring one or more HARQ processes of the UE based at least in part on the indication.

2. The method of claim 1, wherein configuring the one or more HARQ processes comprises mapping one or more soft buffers of the UE to the one or more HARQ processes based at least in part on the indication.

3. The method of claim 2, wherein mapping the one or more soft buffers comprises mapping a first soft buffer to a first HARQ process having a first HARQ process type and mapping a second soft buffer to a second HARQ process having a second HARQ process type, wherein the first soft buffer and the second soft buffer have a different size.

4. The method of claim 1,
   wherein the first set of HARQ processes are permitted to be used by the first TRP and that are not permitted to be used by the second TRP, and
   wherein the second set of HARQ processes are permitted to be used by the second TRP and are not permitted to be used by the first TRP.

5. The method of claim 1, wherein the corresponding plurality of HARQ process types further includes:
   a third HARQ process type corresponding to a third set of HARQ processes, of the plurality of sets of HARQ processes, that are permitted to be used by the first TRP, the second TRP, or both the first TRP and the second TRP.

6. The method of claim 5, wherein the third set of HARQ processes are permitted to be used, by the first TRP or the second TRP, only for simultaneous communications of the first TRP and the second TRP.

7. The method of claim 1, wherein the indication is received in a radio resource control (RRC) message.

8. The method of claim 1,
   wherein the first set of HARQ processes are associated with a first maximum rank or a first number of codewords, and
   wherein the second set of HARQ processes are disjoint from the first set of HARQ processes and are associated with a second maximum rank or a second number of codewords.

9. The method of claim 1, wherein the UE is configured to report a UE capability regarding a number of HARQ processes supported by the UE for one or more of the corresponding plurality of HARQ process types.

10. A method of wireless communication performed by a base station, comprising:
    transmitting, to a user equipment (UE), an indication of a mapping between a plurality of sets of hybrid automatic repeat request (HARQ) processes and a corresponding plurality of HARQ process types, wherein the corresponding plurality of HARQ process types includes:
       a first HARQ process type that identifies a first transmit receive point (TRP) associated with a first set of HARQ processes, of the plurality of sets of HARQ processes, that map to the first HARQ process type, and
       a second HARQ process type that identifies a second transmit receive point (TRP) associated with a second set of HARQ processes, of the plurality of sets of HARQ processes, that map to the second HARQ process type; and
    selecting a HARQ process, from the first set of HARQ processes or the second set of HARQ processes, to be used for a communication with the UE based at least in part on the mapping.

11. The method of claim 10,
    wherein the first set of HARQ processes are permitted to be used by the first TRP and are not permitted to be used by the second TRP, and
    wherein the second set of HARQ processes are permitted to be used by the second TRP and are not permitted to be used by the first TRP.

12. The method of claim 10, wherein the corresponding plurality of HARQ process types further includes:
    a third HARQ process type corresponding to a third set of HARQ processes, of the plurality of sets of HARQ processes, that are permitted to be used by the first TRP, the second TRP, or both the first TRP and the second TRP.

13. The method of claim 12, wherein the third set of HARQ processes are permitted to be used, by the first TRP or the second TRP, only for simultaneous communications of the first TRP and the second TRP.

14. The method of claim 10, wherein the indication is transmitted in a radio resource control (RRC) message.

15. The method of claim 10,
    wherein the first set of HARQ processes are associated with a first maximum rank or a first number of codewords, and
    wherein the second set of HARQ processes are disjoint from the first set of HARQ processes and are associated with a second maximum rank or a second number of codewords.

16. The method of claim 10, wherein the mapping is determined based at least in part on a UE capability report indicating a number of HARQ processes supported by the UE for one or more of the corresponding plurality of HARQ process types.

17. A user equipment (UE) for wireless communication, comprising:
    a memory; and one or more processors operatively coupled to the memory, the memory and the one or more processors configured to:
receive an indication of a mapping between a plurality of sets of hybrid automatic repeat request (HARQ) processes and a corresponding plurality of HARQ process types, wherein the corresponding plurality of HARQ process types includes:
a first HARQ process type that identifies a first transmit receive point (TRP) associated with a first set of HARQ processes, of the plurality of sets of HARQ processes, that map to the first HARQ process type, and
a second HARQ process type that identifies a second transmit receive point (TRP) associated with a second set of HARQ processes, of the plurality of sets of HARQ processes, that map to the second HARQ process type; and
configure one or more HARQ processes of the UE based at least in part on the indication.

18. The UE of claim 17, wherein the one or more processors, when configuring the one or more HARQ processes, are configured to map one or more soft buffers of the UE to the one or more HARQ processes based at least in part on the indication.

19. The UE of claim 18, wherein the one or more processors, when mapping the one or more soft buffers, are configured to map a first soft buffer to a first HARQ process having a first HARQ process type and map a second soft buffer to a second HARQ process having a second HARQ process type, wherein the first soft buffer and the second soft buffer have a different size.

20. The UE of claim 17,
wherein the first set of HARQ processes are permitted to be used by the first TRP and are not permitted to be used by the second TRP, and
wherein the second set of HARQ processes are permitted to be used by the second TRP and are not permitted to be used by the first TRP.

21. The UE of claim 17, wherein the corresponding plurality of HARQ process types further includes:
a third HARQ process type corresponding to a third set of HARQ processes, of the plurality of sets of HARQ processes, that are permitted to be used by the first TRP, the second TRP, or both the first TRP and the second TRP.

22. The UE of claim 21, wherein the third set of HARQ processes are permitted to be used, by the first TRP or the second TRP, only for simultaneous communications of the first TRP and the second TRP.

23. The UE of claim 17,
wherein the first set of HARQ processes are associated with a first maximum rank or a first number of codewords, and
wherein the second set of HARQ processes are disjoint from the first set of HARQ processes and are associated with a second maximum rank or a second number of codewords.

24. The UE of claim 17, wherein the one or more processors are configured to report a UE capability regarding a number of HARQ processes supported by the UE for one or more of the corresponding plurality of HARQ process types.

25. A base station for wireless communication, comprising:
a memory; and
one or more processors operatively coupled to the memory, the memory and the one or more processors configured to:
transmit, to a user equipment (UE), an indication of a mapping between a plurality of sets of hybrid automatic repeat request (HARQ) processes and a corresponding plurality of HARQ process types, wherein the corresponding plurality of HARQ process types includes:
a first HARQ process type that identifies a first transmit receive point (TRP) associated with a first set of HARQ processes, of the plurality of sets of HARQ processes, that map to the first HARQ process type, and
a second HARQ process type that identifies a second transmit receive point (TRP) associated with a second set of HARQ processes, of the plurality of sets of HARQ processes, that map to the second HARQ process type; and
select a HARQ process, from the first set of HARQ processes or the second set of HARQ processes, to be used for a communication with the UE based at least in part on the mapping.

26. The base station of claim 25, wherein the corresponding plurality of HARQ process types further includes:
a third HARQ process type corresponding to a third set of HARQ processes, of the plurality of sets of HARQ processes, that are permitted to be used by the first TRP, the second TRP, or both the first TRP and the second TRP.

27. The base station of claim 26, wherein the third set of HARQ processes are permitted to be used, by the first TRP or the second TRP, only for simultaneous communications of the first TRP and the second TRP.

28. The base station of claim 25,
wherein the first set of HARQ processes are permitted to be used by the first TRP and are not permitted to be used by the second TRP, and
wherein the second set of HARQ processes are permitted to be used by the second TRP and are not permitted to be used by the first TRP.

29. The base station of claim 25, wherein the indication is transmitted in a radio resource control (RRC) message.

30. The base station of claim 25,
wherein the first set of HARQ processes are associated with a first maximum rank or a first number of codewords, and
wherein the second set of HARQ processes are disjoint from the first set of HARQ processes and are associated with a second maximum rank or a second number of codewords.

* * * * *